2 Sheets—Sheet 1.
W. B. ALLEN.
Powder-Duster for Destroying Insects.
No. 217,040. Patented July 1, 1879.
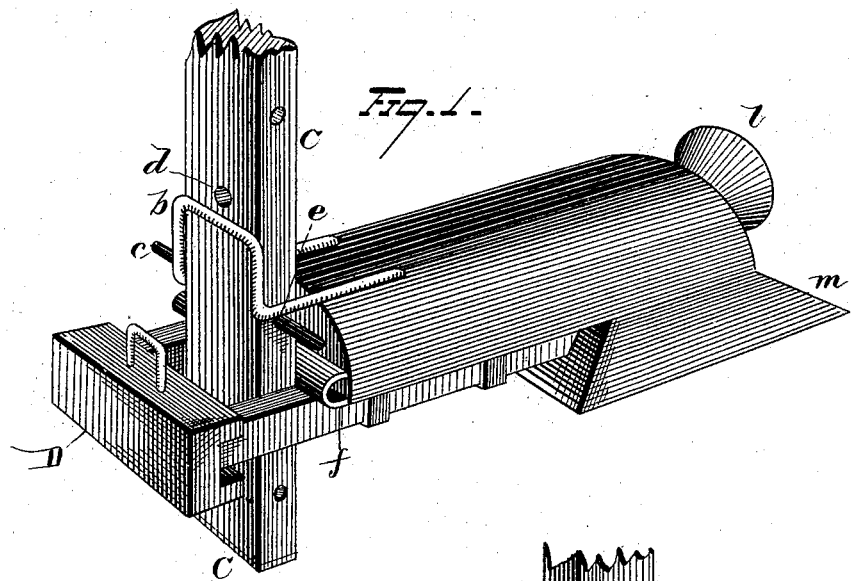
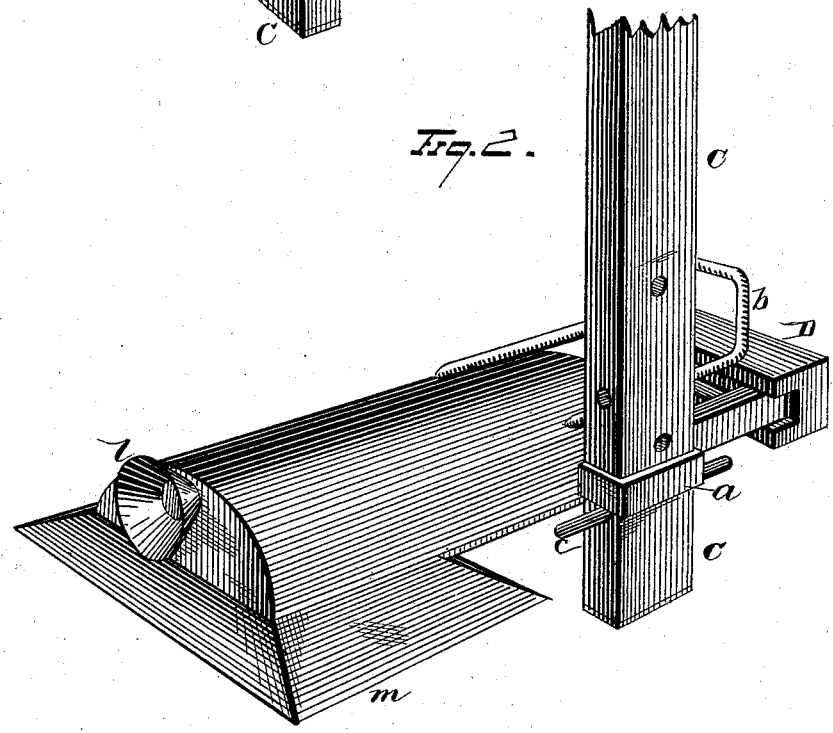
WITNESSES
E. J. Nottingham
A. W. Bright
INVENTOR
Wm B. Allen
By H. A. Seymour
ATTORNEY

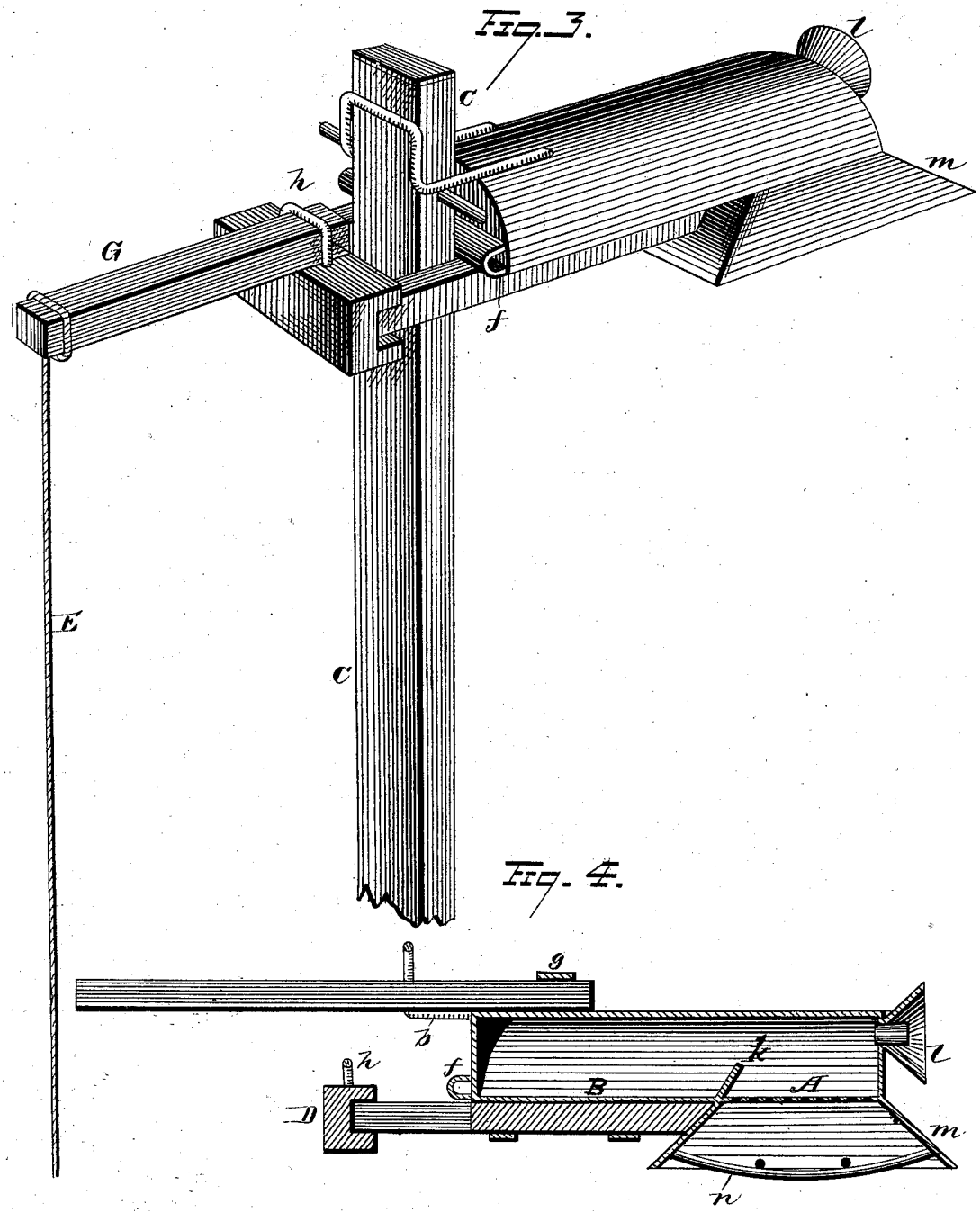

UNITED STATES PATENT OFFICE.

WILLIAM B. ALLEN, OF ORLEANS, NEW YORK.

IMPROVEMENT IN POWDER-DUSTERS FOR DESTROYING INSECTS.

Specification forming part of Letters Patent No. 217,040, dated July 1, 1879; application filed February 18, 1879.

*To all whom it may concern:*

Be it known that I, WILLIAM B. ALLEN, of Orleans, in the county of Ontario and State of New York, have invented certain new and useful Improvements in Insect - Destroyers; and I do hereby declare the following to be a full, clear, and exact description of the invention, such as will enable others skilled in the art to which it pertains to make and use it, reference being had to the accompanying drawings, which form part of this specification.

My invention relates to insect-destroyers, and is designed to provide an improvement which is adapted to carry a suitable quantity of destructive powder or dust, and apply the same as needed in an easy, thorough, and least disagreeable manner.

With this end in view the invention consists, first, in combining with a dust-chamber a horizontal abutment for receiving a blow; second, in combining with a sieve-compartment flaring projections, which extend downward from the sieve-bottom; third, in combining with a sieve-compartment a wire guard projecting from the exposed face of the sieve; fourth, in combining with a reservoir-compartment and a sieve - compartment a partition which separates the same and inclines toward the sieve-compartment.

Referring to the drawings, Figure 1 is a view in perspective of a device representing one form of the invention and in one manner of use. Fig. 2 represents the same device in a different manner of use. Figs. 3 and 4 represent still different manners of use of the same device.

The distributing-compartment A of the dust-chamber is formed in the same horizontal line with the reservoir-compartment B, which latter is provided at its opposite and rear end with several rigid loops, as follows: Loop $a$ is formed on the lower portion of the side of the dust-chamber, and is adapted to provide a firm connection for the support C as the latter engages therewith, the use of the same being mostly in instances when the device is to be taken in among currant or other small bushes. The loop $b$ is adapted for use in instance of employing the said removable support in vertical and also in horizontal position.

In Figs. 1 and 3 the support is shown with pin $c$ engaging transversely with the under side of the horizontal portion of said loop. By placing said pin in one of the holes $d$, which pass through said support at right angles to the series of holes $e$, and causing same to engage with the vertical portion of the loop, the device is also held in position.

With the support placed in vertical position, the discharge of powdered substance can be obtained in either of two ways. The support can be raised and then lowered quickly, so as to impart a jar or shock to the device, which will be effectual in producing the passage of the substance through the sieve; or, by striking blows with a suitable hammer or mallet against the end extension D a similar result will obtain.

The horizontal stop device $f$, secured to the lower portion of the rear end of the dust-chamber, provides lateral bearing for the support C when the latter is in vertical position within loop $b$. The horizontal loop $g$, Fig. 4, secured to the top of the rear end of the dust-chamber, serves, in connection with the horizontal portion of loop $b$, to provide a firm engagement of the independent support with the dust-chamber, this construction being adapted for use when the device is to be inserted horizontally in among or beneath the bushes.

In Fig. 3 is shown a construction adapted for use in connection with trees or tall bushes, and is operated by raising the device on a pole of suitable length, then drawing or jerking down on cord or other flexible connection E, secured to free end of independent lever G, while the opposite end of the latter detachably engages with loop $h$.

The partition $k$ separates the reservoir-compartment from the distributing - compartment and inclines toward the latter, its object being to cause the substance which is to be discharged to remain upon the sieve, in contradistinction to passing into the reservoir-compartment. Hence, as each jar or shock is imparted to the device, the sieve is capable of giving a full or complete discharge, and up to the time that the entire charge is exhausted from the device complete work is done.

The feed-opening $l$ is formed in the upper portion of the front end of the reservoir-compartment over the sieve, and the charge, as it enters said opening when the device is in proper position for being filled, passes over the top of the partition k and into the reservoir-compartment. The flaring projections m of the sieve-compartment permits the sieve to be brought down in close proximity to a greater number of bush-tops at one time than would be possible if the projections were not so formed. Also, they tend to prevent the substance, as it is discharged, from being blown away by the wind or otherwise scattered and lost. They further serve to prevent the powdered substance from flying against the face or person of the one who is operating the device. The wire guard n, with which the exposed face of the sieve is provided, serves to prevent the bushes from clinging to or otherwise interfering with the operation of the same.

The different ways in which this device may be used need not be further explained; neither is it necessary to set forth the various advantages attendant upon the use of this invention, inasmuch as the same are apparent to persons acquainted with other devices of this character.

Any suitable substance may be used as the charge for these devices—for instance, paris-green for use in connection with potato-vines; hellebore for use with currant, gooseberry, rose, and other bushes, plants, or trees; plaster or gypsum on corn or other like vegetable growth.

It will be observed that the discharge from the device may be regular or irregular, in greater or less quantity, or proportioned as desired, by causing corresponding shocks or jars to be imparted to the device, said operation being performed either by raising the support C, and then causing same to return to the ground with sufficient force, or by striking blows of suitable force against the end extension D, as previously set forth. Immediately following the shock or jar the vibration from the loop which engages with the support causes the particles of substance which are already partly out from the sieve to be entirely forced therefrom, thus preventing any after-drip of the charge, which is very unpleasant.

If desired, bits of iron or other pieces of a suitable material may be placed on the inner side of the sieve, so as to prevent the perforations of the latter from clogging up.

When a new quantity of the substance is required on the sieve, the device is tilted or turned with the distributing-compartment downward, which causes the dust to pass over the inclined partition from the reservoir-compartment. The inclined position of this partition, however, prevents a return of the dust, and the latter is therefore held in position over the sieve, ready to be discharged.

In practice, usually paris-green is mixed with buckwheat-flour, plaster, or similar substance, and often in filling the device, especially preparatory for use with large fields of potatoes, it is well to fill the dust-chamber, so that the dust will be in both of the compartments, even up to the mouth of the feed-opening.

Having fully described my invention, what I claim as new, and desire to secure by Letters Patent, is—

1. In an insect-destroyer, the combination, with the dust-chamber, of the horizontal abutment for receiving a blow, substantially as set forth.

2. In an insect-destroyer, the combination, with the sieve-compartment, of the flaring projections which extend downward from the sieve-bottom, substantially as set forth.

3. In an insect-destroyer, the combination, with the sieve-compartment, of the wire guard projecting from the exposed face of the sieve, substantially as set forth.

4. In an insect-destroyer, the combination, with the reservoir-compartment and the sieve-compartment, of the partition which separates them and inclines toward the sieve-compartment, substantially as set forth.

In testimony that I claim the foregoing I have hereunto set my hand and seal this 8th day of February, 1879.

WILLIAM B. ALLEN. [L. S.]

In presence of—
 PLINY T. SEXTON,
 ROBT. M. SMITH.